United States Patent
Glatzel et al.

[11] 3,833,290
[45] Sept. 3, 1974

[54] HIGH POWER WIDE-ANGLE LENS

[75] Inventors: Erhard Glatzel, Heidenheim; Heinz Zajadatz, Aalen, both of Germany; Ludwig Bertele, Heerbrugg, Switzerland

[73] Assignee: Carl Zeiss Stiftung, Wurttemburg, Germany

[22] Filed: Nov. 27, 1972

[21] Appl. No.: 309,645

[30] Foreign Application Priority Data
Nov. 25, 1971  Germany............................ 2158351

[52] U.S. Cl. ................................. 350/214, 350/176
[51] Int. Cl. ................................................ G02b 9/64
[58] Field of Search ........... 350/214, 215, 216, 176, 350/177

[56] References Cited
UNITED STATES PATENTS
3,567,310   3/1971   Bertele........................... 350/215 X
3,700,312   10/1972  Bertele........................... 350/214 X FOREIGN PATENTS OR APPLICATIONS
1,095,767   12/1967   Great Britain.................... 350/216

Primary Examiner—John K. Corbin
Attorney, Agent, or Firm—Stonebraker & Shepard

[57] ABSTRACT

A wide-angle lens of high power, having at least five component groups, separated from each other mainly by air. The groups include two condensing members, preferably separated from each other by a central vertex distance in which there may be a diaphragm. In front of the front condensing member, there are at least two negative meniscus elements, and behind the rear condensing member at least one diverging element. Constructional rules are stated, for various refractive powers, air spaces, and other characteristics, compliance with such rules resulting in an improved lens producing a superior image as compared with prior art lenses of the same general type.

10 Claims, 5 Drawing Figures

HIGH POWER WIDE-ANGLE LENS

BACKGROUND OF THE INVENTION

The present invention relates to a wide-angle lens of high power. Such lenses in general are known in the art, examples being those disclosed in the following United States patents:

| | | |
|---|---|---|
| 2,734,424 | Feb. 14, 1956 | Bertele |
| 3,209,649 | Oct. 5, 1965 | Macher |
| 3,376,091 | Aprl 2, 1968 | Wagner |
| 3,567,310 | Mar. 2, 1971 | Bertele | and in the following Swiss and British patents:

| | | | |
|---|---|---|---|
| Switzerland | 449,995 | Jan. 15, 1968 | Bertele |
| do. | 489,809 | Apr. 30, 1970 | Bertele |
| do. | 489,810 | Aprl 30, 1970 | Bertele |
| Great Britain | 680,185 | Oct. 1, 1952 | Wild |
| do. | 719,162 | Nov. 24, 1954 | Bertele |
| do. | 740,530 | Nov. 16, 1955 | Bertele |
| do. | 1,029,071 | May 11, 1966 | Wild |

The relation of these background patents to the present invention will be discussed below.

SUMMARY OF THE INVENTION

The present invention provides a fast or high power wide-angle lens, the useful picture diameter of which is in general greater than 1.8 times the equivalent focal length F and may be greater than twice same, the entire lens system consisting of at least five component groups separated predominantly by air, with at least eight lenses. Of these, two condensing lens members are preferably separated by a central vertex distance (CS) in which a diaphragm may be arranged, the diaphragm preferably having a variable opening. These condensing lens members are surrounded on the object side by at least two lens members formed as negative meniscuses, and on the image side by at least one diverging lens member, all of which have their cavities (i.e., their concave surfaces) facing the diaphragm. In the condensing lens member located on the object side of the diaphragm space, there is arranged a cemented surface which is elevated (i.e., convex) toward the diaphragm with a smaller index of refraction toward the diaphragm than on the opposite thereof. In the condensing lens member on the image side of the diaphragm space, there is also arranged a cemented surface which is elevated (i.e., convex) toward the diaphragm with a smaller index of refraction toward the diaphragm than on the opposite side thereof.

The objective lenses in accordance with the present invention thus belong to that specific type of high-power wide-angle lens which, in general or in a generic way, was disclosed for the first time in the above mentioned Swiss Pat. No. 449,995. This type of objective lens is further developed in a particularly advantageous manner by its present new subtype. By the further development in accordance with the present invention, there is obtained for the present type of objective lens, as compared with its original older form, an increase in power, which is just as surprising as it is substantial, by the fact that the new subtype and the rules of dimensioning inherent therein for its very specific components (disclosed for the first time by the present invention with respect to their progress of effect) open up the way towards an extremely advanced refinement of correction which extends over the entire wide-angle field of view both of the lateral residual image errors per se and of the aberrations of higher order in the extra-axial image field, which aberrations are particularly disturbing especially when using high relative apertures.

In order to achieve such an enrichment of the imaging power as compared with the prior art, the main emphasis is placed, in accordance with the invention, on the novel specific shape of the front member facing the side of the longer conjugate (i.e., the component groups A, B, and C described in further detail below) of the new subtype of this asymmetric type of lens, and the inventive rules are accordingly measured numerically. Specifically as a result of this new shape of the front member facing the object side, the new subtype of wide-angle objective lens of the present invention differs from the previous structural forms of this type of lens, while with respect to the shape of the rear member facing the image side, the optical designer is allowed very extensive liberties, as can be noted from the known literature (including patent applications which have been published for opposition) as long as the air space which precedes the negative meniscus on the image side is enclosed by two lens surfaces dimensioned in such a manner that the sum of their surface power of refraction is negative and the air space itself therefore forms a negative air lens. If this is complied with, it is then possible in accordance with the invention, to arrive at an embodiment which is just as simple as it is perfect from a technical standpoint if the inner-axial light rays entering without aberration into the objective lens from the remote object are influenced before their entrance in the aforementioned condensing rear member in the very specific manner explained in detail in the following parts of the specification. Such an embodiment will be in agreement with the features contained in the claims for the obtaining of this extremely important advance in the art.

DESCRIPTION OF THE PREFERRED EMBODIMENTS

Figure 1:
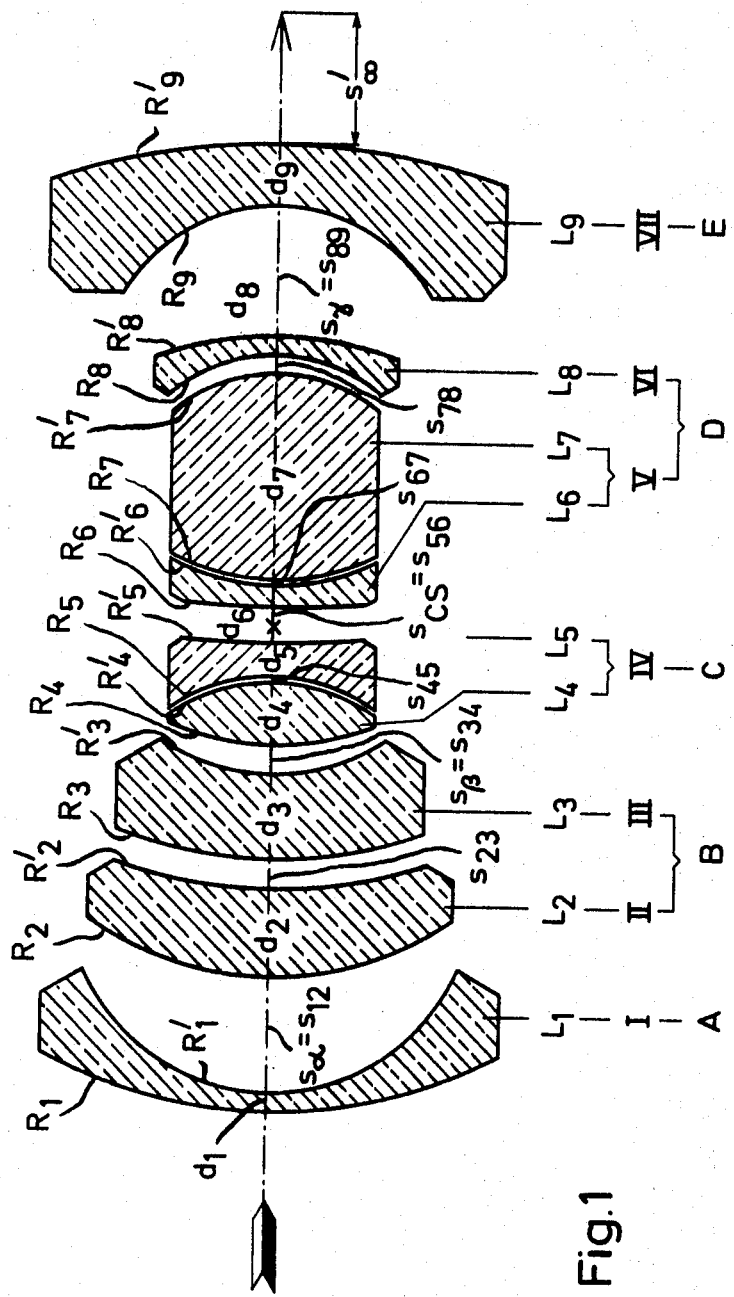
FIG. 1 is a lens diagram illustrating a first example of the present invention.
Figure 2:
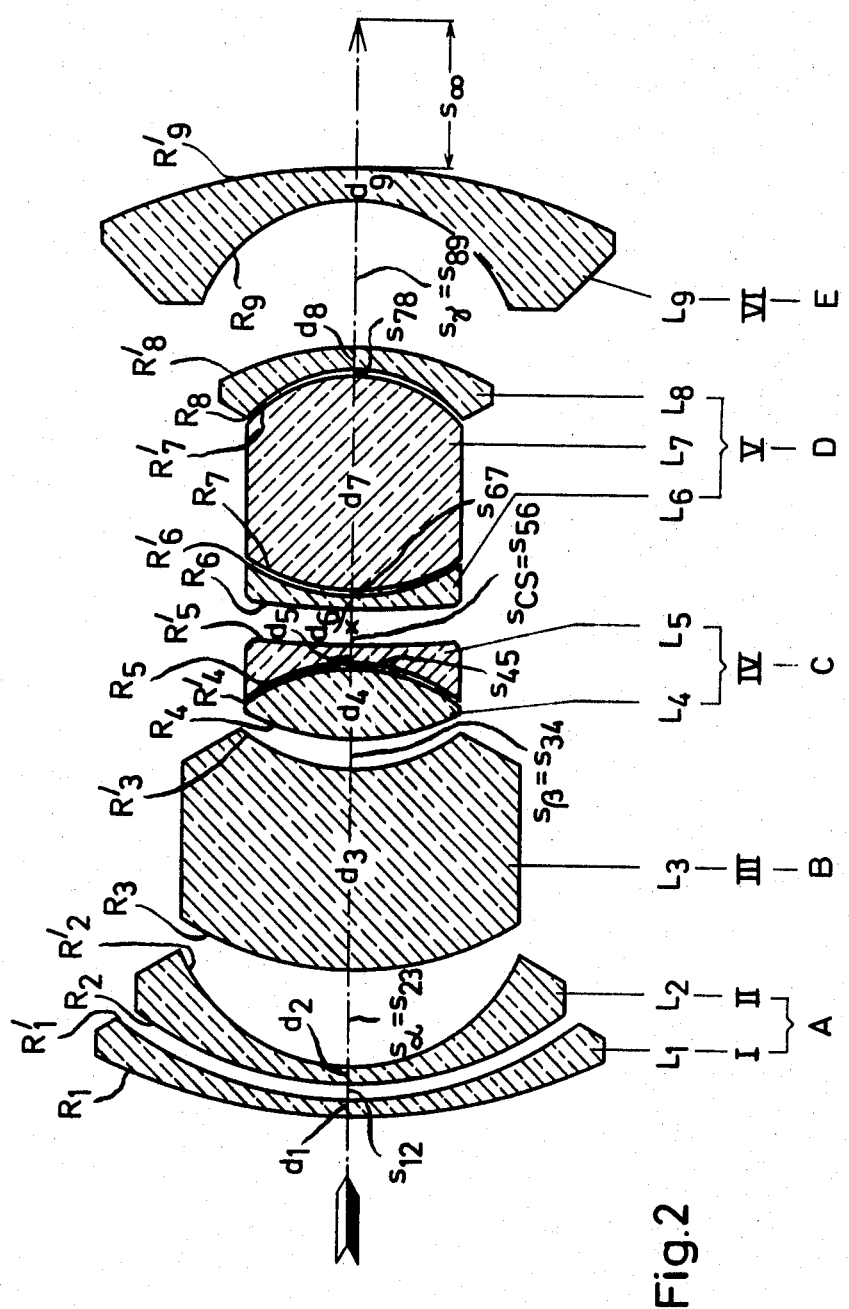
FIG. 2 is a similar diagram illustrating a second example.

In order to shorten and simplify the explanations of the preferred forms of the invention, let us first of all designate the characteristic component groups of the lens of the present invention, in succession from the object side towards the image, by the successive capital letters A through E, of which groups A, B, C form the so-called front member, while the image-side rear member consists of the groups D and E. These groups in their turn are composed of the individual lens members I to V (or VI or even VII, depending on the subdivision) surrounded on both sides by the fluid air.

With due consideration of the above definitions and in accordance with the features set forth in the claims, the invention is characterized by the fact that in this new sub-type of asymmetric wide-angle lenses consisting of an object-side front member provided with positive paraxial focal length and an image-side rear member, the following rules of construction are combined simultaneously in the manner that:

1. An individual member separated by air space and having the outer shape of a negative meniscus — namely the component group B — is arranged in the front member facing the conjugate in front of its condensing individual member (C) which is last in the direction of the light in such a manner that the air space enclosed by these two component groups (B and C) forms a strongly dispersing air lens, the air-lens power of refraction of which ($\phi_\beta$) — as the sum of the two surface refractive powers producing it — is greater in negative value than 0.490 $\phi$ without, however, exceeding the value of 1.200 $\phi$, $\phi$ being the equivalent refractive power of the entire lens system, and that at the same time 2. the sum of the powers of refraction ($\phi_\alpha + \phi_\beta = \phi_{\alpha,\beta}$) of the air lens between the first component group (A) on the object side and the inner second component group (B), as well as between the latter and the condensing third component group (C) of the front lens, is so dimensioned that the negative value of this sum of the powers of refraction ($\phi_{\alpha',\beta}$) is greater than 0.605 $\Phi$ without, however, exceeding a value of 1.400 $\Phi$.

In accordance with the invention, it has furthermore been found particularly advantageous that, still in agreement with the characteristic feature of the corresponding claim, the surface power of refraction ($\phi_1$) of the front surface ($R_1$) facing the longer conjugate together with the surface power of refraction ($\phi_r$) of the rear last outer surface ($R_r$) facing the image of the entire lens system, be so dimensioned that the sum of the surface powers of refraction ($\phi_1 + \phi_1 = \phi_{1,r}$) of these two outer surfaces is greater than 1.290 $\Phi$ without, however, exceeding the value of 1.970 $\Phi$.

In these claim-features, in agreement with scientific practice, the surface powers of refraction of the individual lens surfaces are designated by $\phi = (n' - n) : R$, and the pair surface refractive power sums by $\phi = \Phi_{(x)} + \Phi_{(y)}$ for a successively following pair of lens surfaces of the surface orders ($x$) and ($y$) respectively, while the sums of the surface powers of refraction of the air lenses between the two component groups A and B are designated as $\phi_\alpha$, and between the component groups B and C as $\phi_\beta$, and the sum of the paraxial surface powers ($\phi_\alpha$ plus $\phi_\beta$) of the two characteristic pairs of air lenses of the front member is designated $\phi_{\alpha,\beta}$. Furthermore, in the following data tables, the air-lens power of the inner central vertex distance is designated $\phi_{cs}$ and the sum of the air lens powers of the two lens surfaces enclosing the image-side air space with its axial length $s_\gamma$ is designated $\phi_\gamma$.

Certain characteristic features of the invention can accordingly be expressed by the formulas:

$$0.490 \, \Phi < -\phi_\beta < 1.200 \, \Phi \quad (1)$$

and $$0.605 \, \Phi < -\phi_{\alpha,\beta} < 1.400 \Phi \quad (2)$$

Another feature of one embodiment of the invention can be written in formula form as:

$$1.290 \, \Phi < \phi_{1,r} < 1.970 \Phi \quad (3)$$

in which, as already stated above, $\Phi$ is the equivalent refractive power of the entire objective lens.

In the following data tables there are given nine examples of the new subtype of high-power asymmetric wide-angle objective lens of the present invention, all of which follow the new principle of design for the obtaining of this new subtype of objective lens and are dimensioned accordingly and referred in all cases to the equivalent focal length (F) as unit of length. In this connection, five of these new embodiments satisfy the combination of features set forth in the above formulas 1 and 2, and the other four examples satisfy in addition also the feature of the above formula 3.

In these data tables for the embodiments of the invention, the radii of curvature (R) of the lens surfaces are designated by consecutive numbering from the front surface towards the image. The lens thicknesses measured along the optical axis are designated with the same sequence of numbering by $d$, and the air spaces between the axial vertices of the individual lens parts with $s$, while the indices of refraction of the glasses used are indicated by $n$ in the known manner and with the same sequence of numbers.

Insofar as these objective lenses are to be used, in accordance with the intended purposes, only for a very narrow spectral region, the said index of refraction refers to this specific narrow spectral region. In the event that the new objective lens is used for photographic purposes which are to cover a spectral range of finite width, then, instead of the so-called monochromatic image-error correction, an achromatism is to be effected over the wide spectral range then required, for which purpose in known manner the glasses are so established that by their specific Nu values (Abbe number $\nu$), the color dispersion of the used glasses which is imparted then serves to eliminate the chromatic deviations caused by wavelengths entering into consideration.

In the course of the invention it has been found by way of confirmation in this connection that upon the development of the so-called preforms for the wide-angle objective lens of the invention and then in the course of the following technical rough shaping (rough form) there can take place in routine operation in known manner, with the normally customary first correction in the Seidel range (third order), the use of one of the standard indices of refraction, for instance for the $d$ line of the visible helium spectrum with $\lambda_d = 5876$ A wavelength, as can be noted at any time from the glass catalogues of the manufacturers of optical glass.

In the accompanying figures the same reference numbers have been used with the same consecutive numbering in the direction of the light from the side of the remote object towards the image. In this connection, with respect to the known diameter and distance distribution of this so-called 90° wide-angle objective lens, the cross-sections of the lens construction for the foremost important lens-section shapes of the new objective lens are shown schematically in FIGS. 1 to 4 in order to make the clarity and clearness of their shape particularly visible.

In these figures there are also entered, in agreement with the data tables of the selected examples of the invention, other data, for instance the numbering of the individual lenses (L), the numbering of the lens individual members (I to V or VI or VII respectively) enclosed on both sides by air, while the component groups of the front member on the object side are designated in the same direction of the light, one after the other, by A, B, and C, and the two component groups of the condensing rear member are designated by D and E — as explained above.

In connection with the following nine examples, there is also indicated in each case which one of the figures (FIG. 1 to FIG. 4) shows the diagram of its lens construction.

Example 1. (FIG. 1) concerns a raw form of the new subtype of high-power wide-angle objective lens in accordance with the invention, which is constructed of nine individual lenses, which form seven individual members standing in air (I to VII), the component group D which closely follows behind the central vertex distance ($s_{CS}$) in the rear member consisting of the individual members V and VI, and thus follows that manner of construction of this type of objective lens which has been disclosed in FIG. II of the above mentioned Swiss Pat. No. 449,995 for the subtype of such objective lenses indicated there. At the same time, in this example, furthermore, in the object-side front member, the component group B is composed of the two individual members II and III which stand in air, the two of which have an opposite strength (power) sign. This component group B has, to be sure, in its overall external shape the structural development of a negative meniscus ($R_2 > R'_3$) but, in contradistinction to this, not a negative refractive power, but rather has a paraxial intrinsic focal length of $f_B = \pm \infty$ and is thus within the paraxial range of a component group with no refractive power. This rough form is contemplated for a relative aperture of about $f/3.5$ and a monochromatic precorrection.

In Example 2, (FIG. 2) is the object-side component group A consisting of two individual members (I and II) bordered by air on both sides in the manner that these two individual members have the same strength (power) sign and thus each has a negative intrinsic focal length, in the same way as component group A in its entirety. This example is also provided for a relative aperture of $f/3.5$ with a monochromatic rough correction. In order to prove the wide possibilities of variation in construction of the present subtype, the central vertex distance ($s_{CS}$) is imparted an air-lens power of $\phi_{CS} = \pm 0$, and therefore developed without power of refraction. The component group B which stands in the inside of the front member (individual member III, lens $L_3$) has a negative paraxial focal length of its own of $f_B = -31.842$ F, F being the equivalent focal length of the entire objective lens.

Example 3. (FIG. 3) also has a front component group A formed of two individual members surrounded on both sides by the fluid air and facing the remote object, the two individual members of which (I and II) are provided with opposite sign of strength (power), in contradistinction to the preceding example. The central vertex distance between front member and rear member and thus between the component groups C and D is in this Example 3 (which was intended for a relative aperture of also $f/3.5$) is developed as a dispersing air lens the refractive action of which $(\phi_{CS})$ with $-0.2745$ $\Phi$ has a negative refractive power which, in absolute figures, is therefore considerably greater than one-quarter of the equivalent refractive power $\Phi$ of the overall objective lens.

While Examples 2 and 3 are each formed of six individual members (I to VI) separated by an air space, Example 4 (FIG. 4) is still further simplified and reduced to only five individual members surrounded by air on both sides, with simultaneous increase of the relative aperture to $f/3.0$ and an image angle of about 85° as technical field of use of this monochromatically precorrected rough form in which in the front member the inner component group (B) consists only of one meniscus-shaped individual lens ($L_2 = $ II) which is equipped with a positive paraxial focal length $f_B = +34.640$ F, and thus acts as a condenser, although it has the outer shape of a negative meniscus.

On the other hand, in Example 5 (also FIG. 4) this inner component group (B) in the front member is developed as a true negative meniscus with a paraxial focal length of its own $f_B = -24.372$ F. This example is intended in this connection for a relative aperture of $f/2.9$ with a simultaneous increase of the total angular field of $2\cdot\omega_1 = 88°$ with a precorrection for monochromatic light.

Figure 3:
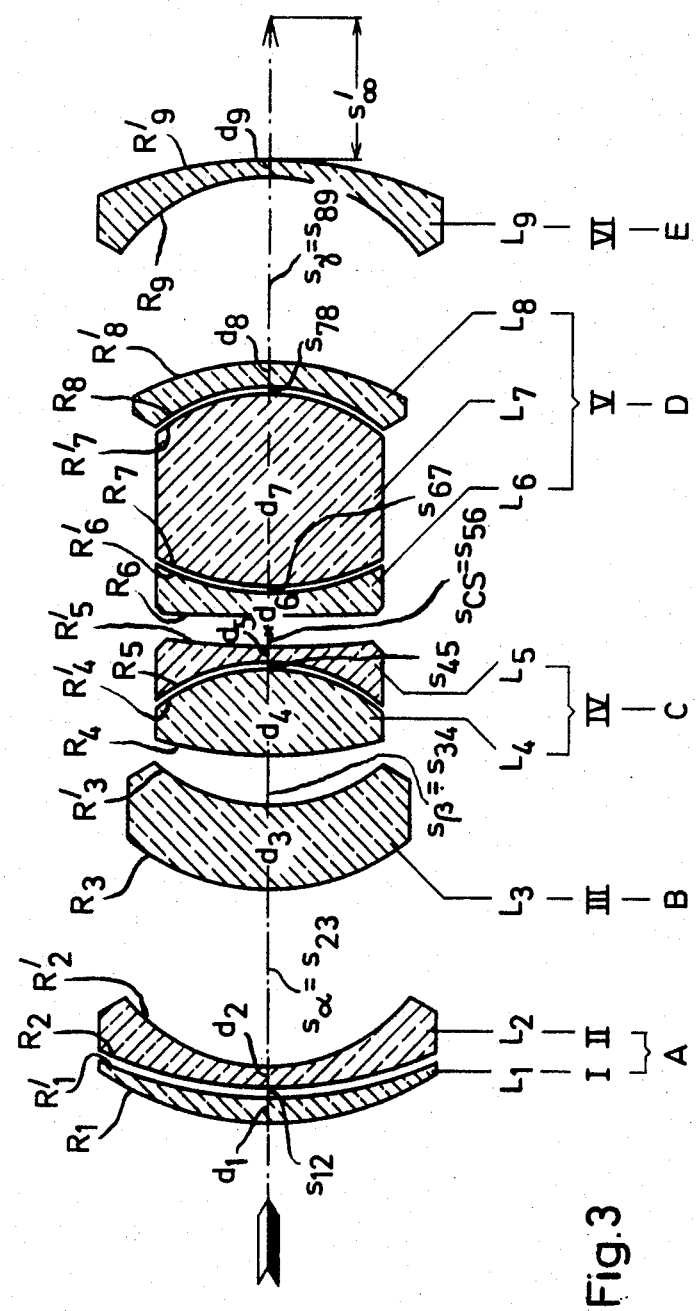
FIG. 3 is a diagram illustrating a third example.
Figure 3A:
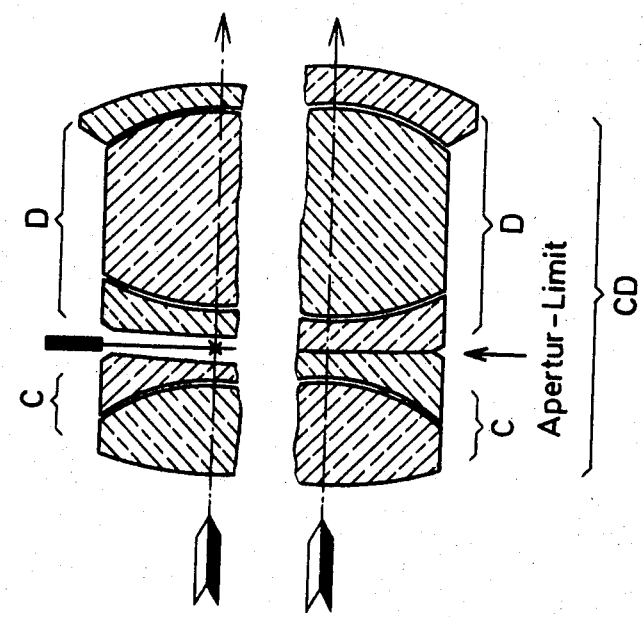
FIG. 3a is a fragmentary diagram illustrating a variation or modification.

By the extreme increase of the imaging power even with large beam cross-section over the very large field of view, a stopping down of the full aperture for reasons of possible improvements in picture sharpness is in general not necessary at all, so that a de facto diaphragm can for this reason be eliminated, in which way at the same time the central vertex distance (CS) between front and rear members of the new objective lens as well as the physical diaphragm can be dispensed with. Accordingly, with Examples 4 and 5 it is sufficiently made obvious to the optic designer by introducing an equality of radii at this place together with a pertinent shortening of the vertex distance ($s_{CS}$) to effect a cementing together of the component groups C and D to form a large pair group (CD), as shown in FIG. 3a of the accompanying drawings, particularly suitable for use with electronic exposure control which, as is known, can operate independently of the diaphragm.

Example 6 (also illustrated schematically in FIG. 4) consists of five individual members (I to V) surrounded by air on both sides and is precision-corrected for a relative aperture of $f/2.8$ over a total field of view of an angular extent of 90°. At the same time, this embodiment is intended for the production of normal color photographs and accordingly equipped with an elimination of chromatic aberrations. Therefore, for the types of glass used for the individual lens there are indicated, in addition to the refractive indices for the yellow d line of the helium spectrum with the wavelength $\lambda_d = 5876$ A, also the Abbe numbers $\nu_d$ in order to characterize the dispersion properties of the glasses as they can be noted at any time from the glass catalogues of the optical glass manufacturers. A comparison of this embodiment provided with a so extremely advanced precision correction with the preforms in accordance with Examples 4 and 5 shows very clearly that in the new subtype of high-power wide-angle lenses, by following the design rules of the invention as set forth above and in the claims, it requires only slight variations of the individual construction elements to arrive from the fundamental opening up of the advance in the art by the rough forms thereupon, at an extremely high attainment of the advance achieved in the precision-corrected embodiment data, and thus to provide the reduction to practice as well as practical utilization with simultaneous restriction to merely five individual members (I to V) standing in air.

The following Example 7 (also illustrated by FIG. 4) is also precision-corrected for a relative aperture of $f/2.8$ over the entire field of view of an angular extent of 90° and at the same time achromatized. As compared with the strongly curved positive-acting outer surfaces ($R_3$ and $R'_7$) of the inner two condensing component groups (C and D) of Example 6, in this example the radii lengths of $R_3$ and $R'_7$ sre suitably extended and their curvatures thus made flatter. In order to compensate for this measure, accordingly, the two condensing object- and picture-side outer surfaces respectively ($R_1$ and $R'_8$) of the two outer negative meniscuses defining the entire lens system are curved more strongly and therefore equipped with shorter radii of curvature.

Figure 4:
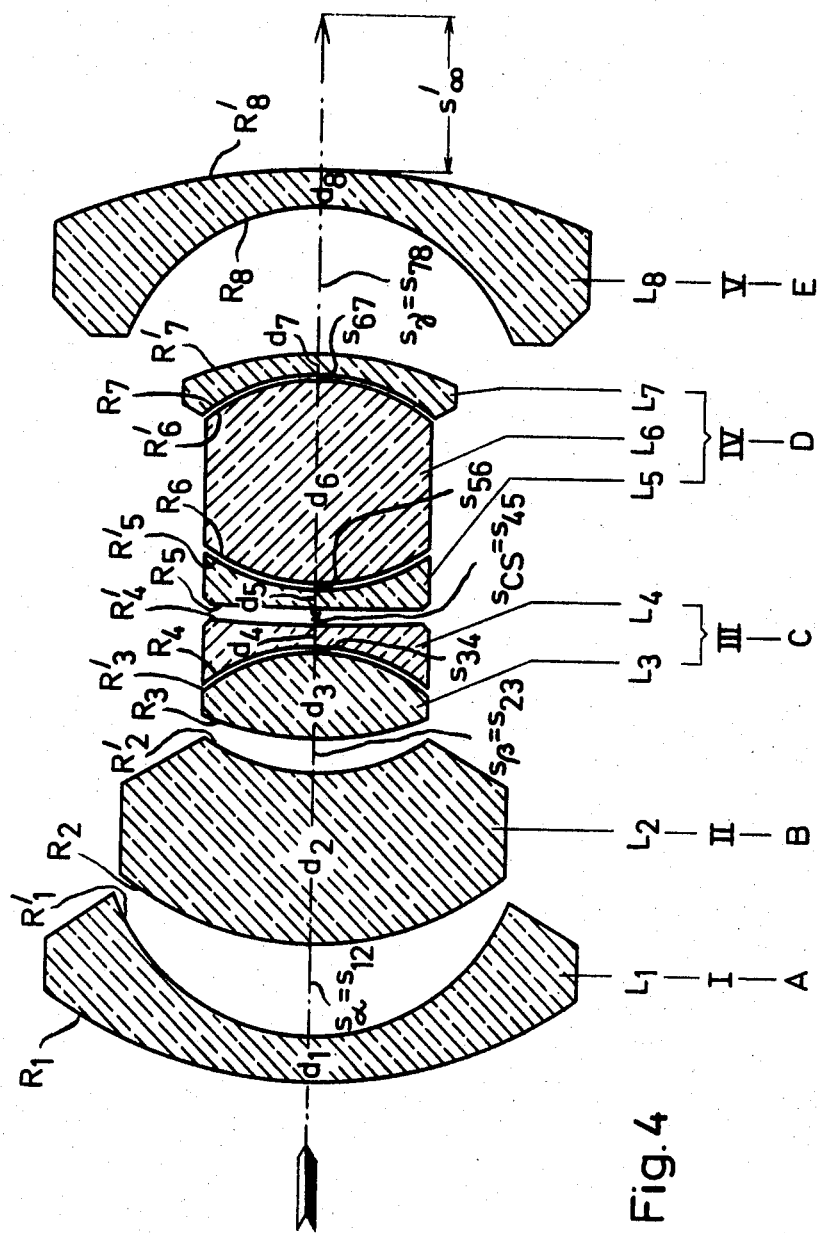
FIG. 4 is a lens diagram illustrative of fourth through ninth examples of the invention.

Both Example 8 and the following Example 9 follow in general the lens construction of FIG. 4. These two examples also have a relative aperture of $f/2.8$ and are achromatized; their total angle of view is also 90°. Both embodiments differ from the preceding precision-corrected examples by their different bending of the most important structure elements and thus show the great range of variation which is made available by the new principle of construction to the practical man, although in many of these precision-corrected forms similar types of glass have been used to simplify comparison at points of important functions.

With regard to the examples, it may furthermore be mentioned by way of explanation that in Example 1 the inner distance ($s_{23}$) between the individual members II and III of component group B has an exact value of 0.0508 7722 for the exact intrinsic focal length of $f_B = \pm \infty$. Since it is furthermore known to the man skilled in the art that with wide-opened and very strongly inclined ray beams, particularly at the inner surfaces of split component groups separated by air, there can very easily occur the danger of a clipping of the outer bundle cross-sectional parts by approximation to the limit angle of total reflection, the way has been shown in FIGS. 1 to 3 of eliminating this danger conveniently in the manner that these inner surfaces are transformed by the optical designer into cement surfaces by which a possible total reflection is thus avoidable in simple fashion. With regard to this, from Example 1 to Example 3, this difference in inner radius is reduced progressively from 12% of the equivalent focal length F (for $R'_2 - R_3$ in Example 1) to precisely 0 (zero) for such a difference in inner radii ($R'_1 - R_2$ in Example 3), so that the optical designer, within the scope of his routine professional practice, need merely effect the fine variation of the lens thicknesses in order to compensate for the axial thickness of the original air gap which has been eliminated by the cementing without any inventive activity on his own part being required for this.

The following are the specific numerical data for the respective examples briefly described and explained above.

Example 1

(FIG. 1)

F = 1.0000  $\qquad s_-' = +0.2811\ F$

| | | | | | |
|---|---|---|---|---|---|
| A I | $L_1$ | $R_1 = +1.1000$ | $d_1 = 0.0350$ | $n_1 = 1.700$ |
| | | $R_1' = +0.4700$ | $s_\alpha = s_{12} = 0.2600$ | |
| B II | $L_2$ | $R_2 = +0.7200$ | $d_2 = 0.2000$ | $n_2 = 1.850$ |
| | | $R_2' = +1.1000$ | $s_{23} = 0.0508...$ | |
| III | $L_3$ | $R_3 = +0.9800$ | $d_3 = 0.2150$ | $n_3 = 1.800$ |
| | | $R_3' = +0.4700$ | $s = s_{34} = 0.0500$ | |
| C IV | $L_4$ | $R_4 = +0.6100$ | $d_4 = 0.1530$ | $n_4 = 1.710$ |
| | | $R_4' = -0.4000$ | $s_{45} = 0$ | |
| | $L_5$ | $R_5 = -0.4000$ | $d_5 = 0.0800$ | $n_5 = 1.600$ |
| | | $R_5' = +2.4000$ | $s_{CS} = s_{56} = 0.0700$ | |
| | $L_6$ | $R_6 = +2.4000$ | $d_6 = 0.0400$ | $n_6 = 1.460$ |
| D V | | $R_6' = +0.5100$ | $s_{67} = 0$ | |
| | $L_7$ | $R_7 = +0.5100$ | $d_7 = 0.4800$ | $n_7 = 1.690$ |
| | | $R_7' = -0.3645$ | $s_{78} = 0.0052\ (\phi = -0.468\ 107\ \Phi)$ | |
| VI | $L_8$ | $R_8 = -0.3600$ | $d_8 = 0.0504$ | $n_8 = 1.850$ |
| | | $R_8' = -0.7200$ | $s_\gamma = s_{89} = 0.3014$ | |
| E VII | $L_9$ | $R_9 = -0.4000$ | $d_9 = 0.1550$ | $n_9 = 1.620$ |
| | | $R_9' = -1.61355$ | | |

Example 2

(FIG. 2)

F = 1.0000    $s_\infty' = + 0.3285\ F$

| | | | | | |
|---|---|---|---|---|---|
| A | I | $L_1$ | $R_1 = + 1.300$ | $d_1 = 0.0300$ | $n_1 = 1.65$ |
| | | | $R_1' = + 0.980$ | $s_{12} = 0.0100$ | |
| | II | $L_2$ | $R_2 = + 0.920$ | $d_2 = 0.0300$ | $n_2 = 1.70$ |
| | | | $R_2' = + 0.465$ | $s_\alpha = s_{23} = 0.2300$ | |
| B | III | $L_3$ | $R_3 = + 0.700$ | $d_3 = 0.5000$ | $n_3 = 1.80$ |
| | | | $R_3' = + 0.465$ | $s_\beta = s_{34} = 0.0400$ | |
| C | IV | $L_4$ | $R_4 = + 0.600$ | $d_4 = 0.1500$ | $n_4 = 1.70$ |
| | | | $R_4' = - 0.400$ | $s_{45} = 0$ | |
| | | $L_5$ | $R_5 = - 0.400$ | $d_5 = 0.0300$ | $n_5 = 1.58$ |
| | | | $R_5' = + 3.000$ | $s_{CS} = s_{56} = 0.0700$ | |
| D | V | $L_6$ | $R_6 = + 2.37931$ | $d_6 = 0.0385$ | $n_6 = 1.46$ |
| | | | $R_6' = + 0.500$ | $s_{67} = 0$ | |
| | | $L_7$ | $R_7 = + 0.500$ | $d_7 = 0.4935$ | $n_7 = 1.69$ |
| | | | $R_7' = - 0.350$ | $s_{78} = 0$ | |
| | | $L_8$ | $R_8 = - 0.350$ | $d_8 = 0.0400$ | $n_8 = 1.85$ |
| | | | $R_8' = - 0.700$ | $s_\gamma = s_{89} = 0.3370$ | |
| E | VI | $L_9$ | $R_9 = - 0.400$ | $d_9 = 0.0800$ | $n_9 = 1.60$ |
| | | | $R_9' = - 1.54183$ | | |

Example 3

(FIG. 3)

F = 1.0000    $s_\infty' = + 0.3292\ F$

| | | | | | |
|---|---|---|---|---|---|
| A | I | $L_1$ | $R_1 = + 0.680$ | $d_1 = 0.0600$ | $n_1 = 1.73$ |
| | | | $R_1' = + 1.000$ | $s_{12} = 0.0200$ | |
| | II | $L_2$ | $R_2 = + 1.000$ | $d_2 = 0.0400$ | $n_2 = 1.70$ |
| | | | $R_2' = + 0.420$ | | |
| | | | | $s_\alpha = s_{23} = 0.4000$ | |
| B | III | $L_3$ | $R_3 = + 0.540$ | $d_3 = 0.2000$ | $n_3 = 1.73$ |
| | | | $R_3' = + 0.420$ | $s_\beta = s_{34} = 0.0800$ | |
| C | IV | $L_4$ | $R_4 = + 1.000$ | $d_4 = 0.2000$ | $n_4 = 1.79$ |
| | | | $R_4' = - 0.420$ | $s_{45} = 0$ | |
| | | $L_5$ | $R_5 = - 0.420$ | $d_5 = 0.0300$ | $n_5 = 1.65$ |
| | | | $R_5' = + 2.200$ | $s_{CS} = s_{56} = 0.0700$ | |
| D | V | $L_6$ | $R_6 = + 22.00$ | $d_6 = 0.0500$ | $n_6 = 1.46$ |
| | | | $R_6' = + 0.600$ | $s_{67} = 0$ | |
| | | $L_7$ | $R_7 = + 0.600$ | $d_7 = 0.4400$ | $n_7 = 1.67$ |
| | | | $R_7' = - 0.420$ | $s_{78} = 0$ | |
| | | $L_8$ | $R_8 = - 0.420$ | $d_8 = 0.0325$ | $n_8 = 1.85$ |
| | | | $R_8' = - 0.660$ | $s_\gamma = s_{89} = 0.4300$ | |
| E | VI | $L_9$ | $R_9 = - 0.440$ | $d_9 = 0.0155$ | $n_9 = 1.70$ |
| | | | $R_9' = - 1.000$ | | |

Example 4

(FIG. 4)

$F = 1.0000$  $s_\infty' = +0.3167 F$

| | | | | | |
|---|---|---|---|---|---|
| A | I | $L_1$ | $R_1 = +1.1000$ | $d_1 = 0.0400$ | $n_1 = 1.695$ |
| | | | $R_1' = +0.4700$ | $s_\alpha = s_{12} = 0.2150$ | |
| B | II | $L_2$ | $R_2 = +0.7150$ | $d_2 = 0.5720$ | $n_2 = 1.805$ |
| | | | $R_2' = +0.4720$ | $s_\beta = s_{23} = 0.0730$ | |
| C | III | $L_3$ | $R_3 = +0.6238$ | $d_3 = 0.1736$ | $n_3 = 1.715$ |
| | | | $R_3' = -0.4050$ | $s_{34} = 0$ | |
| | | $L_4$ | $R_4 = -0.4050$ | $d_4 = 0.0250$ | $n_4 = 1.575$ |
| | | | $R_4' = +2.4500$ | $s_{CS} = s_{45} = 0.0145$ | |
| D | IV | $L_5$ | $R_5 = +2.4500$ | $d_5 = 0.0405$ | $n_5 = 1.465$ |
| | | | $R_5' = +0.5050$ | $s_{56} = 0$ | |
| | | $L_6$ | $R_6 = +0.5050$ | $d_6 = 0.4850$ | $n_6 = 1.690$ |
| | | | $R_6' = -0.3600$ | $s_{67} = 0$ | |
| | | $L_7$ | $R_7 = -0.3600$ | $d_7 = 0.0305$ | $n_7 = 1.855$ |
| | | | $R_7' = -0.7550$ | $s_\gamma = s_{78} = 0.3349$ | |
| E | V | $L_8$ | $R_8 = -0.4350$ | $d_8 = 0.0925$ | $n_8 = 1.620$ |
| | | | $R_8' = -1.4996$ | | |

Example 5

(FIG. 4)

$F = 1.0000$  $s_\infty' = +0.3161 F$

| | | | | | |
|---|---|---|---|---|---|
| A | I | $L_1$ | $R_1 = +1.100$ | $d_1 = 0.0400$ | $n_1 = 1.695$ |
| | | | $R_1' = +0.470$ | $s_\alpha = s_{12} = 0.2550$ | |
| B | II | $L_2$ | $R_2 = +0.710$ | $d_2 = 0.5000$ | $n_2 = 1.805$ |
| | | | $R_2' = +0.470$ | $s_\beta = s_{23} = 0.0400$ | |
| C | III | $L_3$ | $R_3 = +0.610$ | $d_3 = 0.1500$ | $n_3 = 1.715$ |
| | | | $R_3' = -0.405$ | $s_{34} = 0$ | |
| | | $L_4$ | $R_4 = -0.405$ | $d_4 = 0.0250$ | $n_4 = 1.575$ |
| | | | $R_4' = +2.450$ | $s_{CS} = s_{45} = 0.0145$ | |
| D | IV | $L_5$ | $R_5 = +2.450$ | $d_5 = 0.0405$ | $n_5 = 1.465$ |
| | | | $R_5' = +0.505$ | $s_{56} = 0$ | |
| | | $L_6$ | $R_6 = +0.505$ | $d_6 = 0.4850$ | $n_6 = 1.690$ |
| | | | $R_6' = -0.360$ | $s_{67} = 0$ | |
| | | $L_7$ | $R_7 = -0.360$ | $d_7 = 0.0290$ | $n_7 = 1.855$ |
| | | | $R_7' = -0.755$ | $s_\gamma = s_{78} = 0.3350$ | |
| E | V | $L_8$ | $R_8 = -0.435$ | $d_8 = 0.0937$ | $n_8 = 1.620$ |
| | | | $R_8' = -1.500$ | | |

Example 6

(FIG. 4)

$F = 1.0000$  $s_\infty' = +0.3109 F$

| | | | | | | |
|---|---|---|---|---|---|---|
| A | I | $L_1$ | $R_1 = +1.1296$ | $d_1 = 0.0364$ | $n_1 = 1.69761$ | $\nu_1 = 38.56$ |
| | | | $R_1' = +0.4729$ | $s_\alpha = s_{12} = 0.2590$ | | |
| B | II | $L_2$ | $R_2 = +0.7076$ | $d_2 = 0.5023$ | $n_2 = 1.80518$ | $\nu_2 = 25.43$ |
| | | | $R_2' = +0.4695$ | | | |

Example 6 – Continued (FIG. 4)

F = 1.0000      $s_x' = + 0.3109\ F$

| | | | R | s | d | n | ν |
|---|---|---|---|---|---|---|---|
| C | III | L$_3$ | R$_3$ = + 0.6083 | $s_\beta = s_{23} = 0.0364$ | d$_3$ = 0.1510 | n$_3$ = 1.71300 | ν$_3$ = 53.85 |
| | | | R$_3'$ = − 0.4066 | $s_{34} = 0$ | | | |
| | | L$_4$ | R$_4$ = − 0.4066 | | d$_4$ = 0.0221 | n$_4$ = 1.57501 | ν$_4$ = 41.49 |
| | | | R$_4'$ = + 2.3195 | $s_{CS} = s_{45} = 0.0651$ | | | |
| D | IV | L$_5$ | R$_5$ = + 2.5654 | | d$_5$ = 0.0390 | n$_5$ = 1.46450 | ν$_5$ = 65.70 |
| | | | R$_5'$ = + 0.5082 | $s_{56} = 0$ | | | |
| | | L$_6$ | R$_6$ = + 0.5082 | | d$_6$ = 0.5101 | n$_6$ = 1.68900 | ν$_6$ = 49.46 |
| | | | R$_6'$ = − 0.3624 | $s_{67} = 0$ | | | |
| | | L$_7$ | R$_7$ = − 0.3624 | | d$_7$ = 0.0299 | n$_7$ = 1.85544 | ν$_7$ = 36.59 |
| | | | R$_7'$ = − 0.7230 | $s_\gamma = s_{78} = 0.3370$ | | | |
| E | V | L$_8$ | R$_8$ = − 0.4369 | | d$_8$ = 0.1028 | n$_8$ = 1.62041 | ν$_8$ = 60.29 |
| | | | R$_8'$ = − 1.4955 | | | | |

Example 7

(FIG. 4)

F = 1.0000      $s_x' = + 0.3692\ F$

| | | | R | s | d | n | ν |
|---|---|---|---|---|---|---|---|
| A | I | L$_1$ | R$_1$ = + 0.8431 | | d$_1$ = 0.0394 | n$_1$ = 1.73520 | ν$_1$ = 41.58 |
| | | | R$_1'$ = + 0.4845 | $s_\alpha = s_{12} = 0.4580$ | | | |
| B | II | L$_2$ | R$_2$ = + 0.5436 | | d$_2$ = 0.1803 | n$_2$ = 1.80518 | ν$_2$ = 25.43 |
| | | | R$_2'$ = + 0.4443 | $s_\beta = s_{23} = 0.0821$ | | | |
| C | III | L$_3$ | R$_3$ = + 0.9460 | | d$_3$ = 0.2202 | n$_3$ = 1.78831 | ν$_3$ = 47.37 |
| | | | R$_3'$ = − 0.4845 | $s_{34} = 0$ | | | |
| | | L$_4$ | R$_4$ = − 0.4845 | | d$_4$ = 0.1067 | n$_4$ = 1.63980 | ν$_4$ = 34.60 |
| | | | R$_4'$ = + 2.1179 | $s_{CS} = s_{45} = 0.0694$ | | | |
| D | IV | L$_5$ | R$_5$ = + 5.8838 | | d$_5$ = 0.0495 | n$_5$ = 1.46450 | ν$_5$ = 65.70 |
| | | | R$_5'$ = + 0.4845 | $s_{56} = 0$ | | | |
| | | L$_6$ | R$_6$ = + 0.4845 | | d$_6$ = 0.5396 | n$_6$ = 1.68273 | ν$_6$ = 44.51 |
| | | | R$_6'$ = − 0.3821 | $s_{67} = 0$ | | | |
| | | L$_7$ | R$_7$ = − 0.3821 | | d$_7$ = 0.0495 | n$_7$ = 1.84666 | ν$_7$ = 23.82 |
| | | | R$_7'$ = − 0.8133 | $s_\gamma = s_{78} = 0.3523$ | | | |
| E | V | L$_8$ | R$_8$ = − 0.4607 | | d$_8$ = 0.0329 | n$_8$ = 1.71300 | ν$_8$ = 53.85 |
| | | | R$_8'$ = − 0.9598 | | | | |

Example 8

(FIG. 4)

F = 1.0000      $s_x' = + 0.3207\ F$

| | | | R | s | d | n | ν |
|---|---|---|---|---|---|---|---|
| A | I | L$_1$ | R$_1$ = + 0.6720 | | d$_1$ = 0.0341 | n$_1$ = 1.71300 | ν$_1$ = 53.85 |
| | | | R$_1'$ = + 0.4559 | $s_\alpha = s_{12} = 0.3753$ | | | |
| B | II | L$_2$ | R$_2$ = + 0.5378 | | d$_2$ = 0.2331 | n$_2$ = 1.72830 | ν$_2$ = 28.68 |
| | | | R$_2'$ = + 0.4003 | $s_\beta = s_{23} = 0.0896$ | | | |
| C | III | L$_3$ | R$_3$ = + 1.0129 | | d$_3$ = 0.1910 | n$_3$ = 1.78831 | ν$_3$ = 47.37 |
| | | | R$_3'$ = − 0.4241 | $s_{34} = 0$ | | | |
| | | L$_4$ | R$_4$ = − 0.4241 | | d$_4$ = 0.0377 | n$_4$ = 1.65473 | ν$_4$ = 32.87 |
| | | | R$_4'$ = + 2.2510 | $s_{CS} = s_{45} = 0.0676$ | | | |

Example 8 — Continued (FIG. 4)

F = 1.0000    $s_x' = +0.3207\,F$

| | | | | | | |
|---|---|---|---|---|---|---|
| | | $L_5$ | $R_5 = +19.922$ | $d_5 = 0.0493$ | $n_5 = 1.46450$ | $\nu_5 = 65.70$ |
| | | | $R_5' = +0.6120$ | $s_{56} = 0$ | | |
| D | IV | $L_6$ | $R_6 = +0.6120$ | $d_6 = 0.4440$ | $n_6 = 1.66892$ | $\nu_6 = 44.98$ |
| | | | $R_6' = -0.4091$ | $s_{67} = 0$ | | |
| | | $L_7$ | $R_7 = -0.4091$ | $d_7 = 0.0372$ | $n_7 = 1.84666$ | $\nu_7 = 23.82$ |
| | | | $R_7' = -0.6530$ | $s_\gamma = s_{78} = 0.4463$ | | |
| E | V | $L_8$ | $R_8 = -0.4724$ | $d_8 = 0.0328$ | $n_8 = 1.71300$ | $\nu_8 = 53.85$ |
| | | | $R_8' = -0.9984$ | | | |

Example 9

(FIG. 4)

F = 1.0000    $s_x' = +0.3529\,F$

| | | | | | | |
|---|---|---|---|---|---|---|
| A | I | $L_1$ | $R_1 = +0.91002$ | $d_1 = 0.0517$ | $n_1 = 1.58893$ | $\nu_1 = 51.39$ |
| | | | $R_1' = +0.51913$ | $s_\alpha = s_{12} = 0.5011$ | | |
| B | II | $L_2$ | $R_2 = +0.50438$ | $d_2 = 0.1330$ | $n_2 = 1.78470$ | $\nu_2 = 26.08$ |
| | | | $R_2' = +0.41531$ | $s_\beta = s_{23} = 0.1266$ | | |
| | | $L_3$ | $R_3 = +0.97786$ | $d_3 = 0.2299$ | $n_3 = 1.78831$ | $\nu_3 = 47.37$ |
| C | III | | $R_3' = -0.51913$ | $s_{34} = 0$ | | |
| | | $L_4$ | $R_4 = -0.51913$ | $d_4 = 0.1318$ | $n_4 = 1.65446$ | $\nu_4 = 33.67$ |
| | | | $R_4' = +4.46321$ | $s_{CS} = s_{45} = 0.0697$ | | |
| | | $L_5$ | $R_5 = \pm\,\text{plan}$ | $d_5 = 0.2222$ | $n_5 = 1.62299$ | $\nu_5 = 58.06$ |
| | | | $R_5' = +0.49004$ | $s_{56} = 0$ | | |
| D | IV | $L_6$ | $R_6 = +0.49004$ | $d_6 = 0.3681$ | $n_6 = 1.74400$ | $\nu_6 = 44.77$ |
| | | | $R_6' 032 -0.40358$ | $s_{67} = 0$ | | |
| | | $L_7$ | $R_7 = -0.40358$ | $d_7 = 0.0310$ | $n_7 = 1.84666$ | $\nu_7 = 23.82$ |
| | | | $R_7' = -0.87148$ | $s_\gamma = s_{78} = 0.3849$ | | |
| E | V | $L_8$ | $R_8 = -0.45932$ | $d_8 = 0.0336$ | $n_8 = 1.71300$ | $\nu_8 = 53.85$ |
| | | | $R_8' = -0.92317$ | | | |

In the preceding data tables of the examples, all lengths, and therefore the radii of curvature (R), axial thicknesses (d) of the lenses, and the vertex distances (s) between them are expressed as whole and/or decimal-fractional multiples of the reference unit (F = 1), so that it has been possible to dispense with the describing of this reference letter (F) in known manner, in agreement with the procedure frequently to be encountered in scientific literature.

It will be noted that in the foregoing numerical data tables, some of the axial spacings between certain lens elements are stated to have a value of zero, e.g., spacings $s_{45}$, and $s_{67}$ in Example 1, spacings $s_{45}$, $s_{67}$, and $s_{78}$ in Example 3, etc. This means that where the spacing is stated to be zero, and where the adjacent radii are the same, the adjacent surfaces are cemented, even though in the lens drawings or diagrams the adjacent elements are shown somewhat separated from each other, for clarity of illustration.

The following Table A gives the respective values, for each of the respective Examples 1 to 9, of the terms or features referred to in the above stated formulas 1 and 2, set forth in clearly viewed fashion for all nine embodiments. From the numerical values indicated, it can be clearly seen that the new subtype of this type of lens, in strict contradiction to the older subtypes of such construction forms, is provided in the inside of its front member with extremely large negative refractive-power additions for the air lens between the inner meniscus (component group B) and the following central front condensing part (component group C) limiting the front member in the direction towards the image. In this connection, this air-lens refractive power ($\phi_\beta$) is made so large that at the same time also the sum of the refractive power of the combination of the two characteristic air lenses ($\phi_\alpha + \phi_\beta = \phi_{\alpha,\beta}$), in agreement with formula 2, lies in that negative region which is exactly numerically described in the second formula.

In Table B there are indicated the values, for all nine embodiments, one after the other, of $\phi_{1,r}$ referred to in the above stated formula 3, with addition of a further vertical column in which the correspondence of the individual examples either to Claim 1 or to Claim 2 is indicated.

In order to save arithmetical work for the reader, there is furthermore given in Table C a summary compilation of the numerical variables of different numerical data serving as explanations which are without importance for the invention per se, but which give the optical designer a clear picture of the extremely wide range of variation within the framework of the new principle of design.

Table A

Values of features in accordance with formulas (1) and (2)

| Example No. | $\phi_\beta$ | $\phi_{\alpha\ ,\beta}$ |
|---|---|---|
| 1 | $-0.5382\ \Phi$ | $-0.8470\ \Phi$ |
| 2 | $-0.5538\ \Phi$ | $-0.9163\ \Phi$ |
| 3 | $-0.9481\ \Phi$ | $-1.2629\ \Phi$ |
| 4 | $-0.5593\ \Phi$ | $-0.9122\ \Phi$ |
| 5 | $-0.5406\ \Phi$ | $-0.8856\ \Phi$ |
| 6 | $-0.5429\ \Phi$ | $-0.8800\ \Phi$ |
| 7 | $-0.9789\ \Phi$ | $-1.0151\ \Phi$ |
| 8 | $-1.0409\ \Phi$ | $-1.2504\ \Phi$ |
| 9 | $-1.0833\ \Phi$ | $-0.6620\ \Phi$ |
| Designation | Partial feature, formula (1) | Partial feature, formula (2) |

Table B

Values of features in accordance with formula (3)

| Example No. | $\phi_{l,r}$ | Claim |
|---|---|---|
| 1 | $+1.0206\ \Phi$ | 1) |
| 2 | $+0.8891\ \Phi$ | 1) |
| 3 | $+1.7735\ \Phi$ | 2) |
| 4 | $+1.0453\ \Phi$ | 1) |
| 5 | $+1.0452\ \Phi$ | 1) |
| 6 | $+1.0324\ \Phi$ | 1) |
| 7 | $+1.6148\ \Phi$ | 2) |
| 8 | $+1.7751\ \Phi$ | 2) |
| 9 | $+1.4195\ \Phi$ | 2) |

Table C

Additional summary compilation

| Example No. | $\phi_r$ | $\phi_{cs}$ | $f_B$ |
|---|---|---|---|
| 1 | $-0.3694\ \Phi$ | $-0.0583\ \Phi$ | $\pm\infty$ |
| 2 | $-0.2857\ \Phi$ | $\pm 0$ | $-31.842\ F$ |
| 3 | $-0.3030\ \Phi$ | $-0.2745\ \Phi$ | $-8.6369\ F$ |
| 4 | $-0.2928\ \Phi$ | $-0.0449\ \Phi$ | $+34.640\ F$ |
| 5 | $-0.2928\ \Phi$ | $-0.0449\ \Phi$ | $-24.372\ F$ |
| 6 | $-0.2367\ \Phi$ | $-0.0668\ \Phi$ | $-29.442\ F$ |
| 7 | $-0.5068\ \Phi$ | $-0.2232\ \Phi$ | $-15.913\ F$ |
| 8 | $-0.2128\ \Phi$ | $-0.2675\ \Phi$ | $-7.5402\ F$ |
| 9 | $-0.5808\ \Phi$ | $-0.1466\ \Phi$ | $-8.7304\ F$ |

From the above tables it can easily be seen that by the examples of the present invention, the range in positions of the characteristic features in accordance with the claims and with above formulas 1, 2, and 3, has been proven in detail in the normally customary tolerance range of less than ±10% for the [lower limit /maximum position] of their numerical values. At the same time, it can be noted from the examples that the two outside negative meniscuses which define both the longer and the shorter conjugates, in strict contrast to the original subtype of this type of lens in accordance with Swiss Pat. No. 449,995, can be constructed not unconditionally from glasses of very low refraction, but rather with great technical success also from glasses with higher indices of refraction, whereby, due to the proportional relationships, the values of the surface powers desired by the optical designer for these outer lenses of maximum diameter are then realizable correspondingly smaller surface curvatures and therefore also with relatively long radii of curvature, so particularly favorable in manufacture, particularly in case of large lens diameters, of the surfaces of these lenses adjoining the medium air, without undesirable concessions as to the dimensioning of the refractive powers for these lenses having to be tolerated for the practical utilization of these advantages.

With respect to the prior art, 31 older approximately comparable objective lenses of other subtypes of similar wide-angle systems have been selected for comparison purposes and their comparative values or characteristics compiled in the following Table I and Table II. The comparative numerical values in Table I are the result of exact digital-electronic computations of the respective prior art lenses, rounded off to 4 decimal places. It is furthermore pointed out that the five objective lenses of the subtype in accordance with Swiss Pat. No. 449,995 are identical with those of U.S. Pat. No. 3,567,310. Furthermore, there has also become known from German Gebrauchsmuster or Petty Pat. No. 1,966,388, a type of objective lens in which, however, the rear member, in contradistinction to the present invention, is not a positive member, but rather exerts a dispersing action, so that in this older lens the rear member represents in fact a long focal length telenegative and therefore is not comparable. In this system also, $\phi_\beta = -0.3020\ \Phi$ and also $\phi_{\alpha\ ,\beta} = -0.4701\ \Phi$, both values being far below the permissible range of the rules of construction in accordance with the present invention.

Table I

The prior art

| Patent | | $\phi_\beta$ | $\phi_{\alpha\ ,\beta}$ |
|---|---|---|---|
| Swiss Patent | 449,995/1 | $-0.2498\ \Phi$ | $-0.2160\ \Phi$ |
| do. | do. /2 | $-0.3719\ \Phi$ | $-0.2584\ \Phi$ |
| do. | do. /3 | $-0.4824\ \Phi$ | $-0.2992\ \Phi$ |
| do. | do. /4 | $-0.4213\ \Phi$ | $-0.2496\ \Phi$ |
| do. | do. /5 | $-0.1460\ \Phi$ | $-0.1800\ \Phi$ |
| Swiss Patent | 489,809 | $-0.1460\ \Phi$ | $-0.1799\ \Phi$ |
| Swiss Patent | 489,810/1 | $-0.2401\ \Phi$ | $-0.3194\ \Phi$ |
| do. | do. /2 | $-0.2394\ \Phi$ | $-0.3063\ \Phi$ |
| British Patent | 680,185/I | positive | $-0.0744\ \Phi$ |
| do. | do. /II | positive | $-0.1717\ \Phi$ |
| British Patent | 719,162/1 | positive | $-0.4245\ \Phi$ |
| do. | do. /2 | positive | $-0.1946\ \Phi$ |
| do. | do. /3 | positive | $-0.0917\ \Phi$ |

Table II

The prior art

| Patent | | Construction of System |
|---|---|---|
| British Patent | 740,530/1 | Symmetrical construction |
| do. | do. /2 | $\phi_\beta$ = positive |
| do. | do. /3 | $\phi_\beta$ = positive |
| do. | do. /4 | Symmetrical construction |
| British Patent | 1,029,071/1 | $s_\beta$ : nonexistent |
| do. | do. /2 | $s_\beta$ : nonexistent |
| do. | do. /3 | $s_\beta$ : nonexistent |

Table II-Continued

The prior art

| Patent | | Construction of System |
|---|---|---|
| U.S. Patent | 2,734,424/1 | $\phi_\beta$ = positive |
| do. | do. /2 | $\phi_\beta$ = positive |
| do. | do. /3 | $\phi_\beta$ = positive |
| do. | do. /4 | $\phi_\beta$ = positive |
| do. | do /5 | Symmetrical construction |
| do. | do. /6 | $\phi_\beta$ = positive |
| do. | do. /7 | $\phi_\beta$ = positive |
| do. | do. /8 | Symmetrical construction |
| do. | do. /9 | Symmetrical construction |
| U.S. Patent | 3,209,649 | $s_\beta$ : nonexistent |
| U.S. Patent | 3,376,091 | $s_\beta$ : nonexistent |

As can be noted from Table II, the wide-angle lenses compiled there are not comparable with the present new subtype of high-power asymmetric wide-angle systems in accordance with the invention, since these older lenses either have a symmetrical construction or else, between the component groups B and C, an air-lens power ($\phi_\beta$) of positive sign. Therefore the latter, in strict contrast to the present invention, is not developed as a negative air lens of strong overcorrection action, but rather as, in all the cases indicated, a condensing air lens in the sense of an air lens effecting undercorrection. for the last-mentioned reason there are concerned in such variations in general relatively low-power wide-angle systems the aperture ratio of which is generally between $f/5.5$ and $f/4.5$ insofar as they are to be equipped with somewhat tolerable zone errors of the inner and outer-axial spherical aberrations for their practical use.

Furthermore, there are also indicated in Table II those subtypes of the general type of such wide-angle lenses, namely, the proposals in accordance with British Pat. No. 1,029,071 and U.S. Pat. Nos. 3,209,649 and 3,376,091, which do not possess the air-lens characteristic of the invention. Hence in their case the very specific and surprising and important enrichment of the increase in the imaging power, which is opened up for the first time by the present invention, cannot be realized at all. In Table II it is indicated with regard to these cited systems that the air distance $s_\beta$ is nonexistent, so that at the same time the existence of this characteristic air lens automatically drops out.

In the claims, the expression "central vertex position" is intended to refer to the location between the front condensing group C and the rear condensing group D, regardless of whether there is actually a space at this location (where a diaphragm could be placed, if desired) or whether there is no space at this location, the two condensing groups being placed tight together as illustrated in the lower part of FIG. 3a. Also, in certain of the claims, the same symbols are used as in the foregoing description, and it is thought that the meaning will be clear to those skilled in the art, without repeating the definitions of the symbols in the claims themselves.

What is claimed is:

1. A high power asymmetrical wide-angle lens having at least eight lens elements constituting at least five component groups predominantly air spaced from each other, said elements and groups including a condensing object-side front member (C) and a condensing image-side rear member (D) at front and rear respectively of a central vertex position, said elements and groups also including at least two negative meniscus groups (A and B) in front of said front condensing member (C) and having concave surfaces facing said front condensing member and at least one dispersing element behind said rear condensing member and having a concave surface facing said rear condensing member, said front condensing member (C) including a cemented surface which is convex toward said central vertex position, the index of refraction of the material on the rear side of said cemented surface being less than the index of refraction of the material on the forward side of said cemented surface, said rear condensing member (D) also including a cemented surface which is convex toward said central vertex position, the index of refraction of the material on the forward side of such cemented surface being less than the index of refraction of the material on the rear side of such cemented surface, the groups (A and B) in front of said front condensing member (C) including a member (B) separated by air space from said front condensing member and having the outer shape of a negative meniscus, the air space enclosed between said last mentioned member (B) and said front condensing member (C) forming a strongly dispersing air lens, the air lens power ($\phi_\beta$) of which, as the sum of the powers of the two surfaces producing it, has a negative value greater than 0.490 $\Phi$ but not greater than 1.200 $\Phi$, there also being an air space forming an air lens between said two groups (A and B) in front of said front condensing member, the sum of the refractive powers ($\phi_\alpha + \phi_\beta = \phi_{\alpha,\beta}$) of said last mentioned air lens ($\phi_\alpha$) and said first mentioned air lens ($\phi_\beta$) having a negative value greater than 0.605 $\Phi$ and not greater than 1.400 $\Phi$, wherein $\Phi$ represents the equivalent refractive power of the entire lens system, the surface refractive power ($\phi_l$) of the front surface ($R_1$) of the entire lens system and the surface refractive power ($\phi_r$) of the last rear outer surface ($R_r$) of the entire lens system being so chosen that the sum of said surface refractive powers ($\phi_l + \phi_r = \phi_{l,r}$) is greater than 1.290 $\Phi$ but not greater than 1.970 $\Phi$.

2. A lens as defined in claim 1, wherein the dimensions and other characteristics are substantially as indicated in the following table, linear dimensions being expressed in proportion to the equivalent focal length F = 1 of the entire lens assembly

| | | | | | |
|---|---|---|---|---|---|
| A | I | $L_1$ | $R_1 = +0.680$ F | $d_1 = 0.0600$ F | $n_1 = 1.73$ |
| | | | $R_1' = +1.000$ F | $s_{12} = 0.0200$ F | |
| | II | $L_2$ | $R_2 = +1.000$ F | $d_2 = 0.0400$ F | $n_2 = 1.70$ |
| | | | $R_2' = +0.420$ F | $s_\beta = s_{23} = 0.4000$ F | |
| B | III | $L_3$ | $R_3 = +0.540$ F | $d_3 = 0.2000$ F | $n_3 = 1.73$ |

| | | | | | |
|---|---|---|---|---|---|
| C | IV | L₄ | $R_3' = +0.420\ F$ | $s_\beta = s_{34} = 0.0800\ F$ | |
| | | | $R_4 = +1.000\ F$ | $d_4 = 0.2000\ F$ | $n_4 = 1.79$ |
| | | | $R_4' = -0.420\ F$ | $s_{45} = 0$ | |
| | | L₅ | $R_5 = -0.420\ F$ | $d_5 = 0.0300\ F$ | $n_5 = 1.65$ |
| | | | $R_5' = +2.200\ F$ | $s_{CS} = s_{56} = 0.0700\ F$ | |
| D | V | L₆ | $R_6 = +22.00\ F$ | $d_6 = 0.0500\ F$ | $n_6 = 1.46$ |
| | | | $R_6' = +0.600\ F$ | $s_{67} = 0$ | |
| | | L₇ | $R_7 = +0.600\ F$ | $d_7 = 0.4400\ F$ | $n_7 = 1.67$ |
| | | | $R_7' = -0.420\ F$ | $s_{78} = 0$ | |
| | | L₈ | $R_8 = -0.420\ F$ | $d_8 = 0.0325\ F$ | $n_8 = 1.85$ |
| | | | $R_8' = -0.660\ F$ | $s_\gamma = s_{89} = 0.4300\ F$ | |
| E | VI | L₉ | $R_9 = -0.440\ F$ | $d_9 = 0.0155\ F$ | $n_9 = 1.70$ |
| | | | $R_9' = -1.000\ F$ | | |

3. A lens as defined in claim 1, wherein the dimensions and other characteristics are substantially as indicated in the following table, linear dimensions being expressed in proportion to the equivalent focal length F = 1 of the entire lens assembly

| | | | | | |
|---|---|---|---|---|---|
| A | I | L₁ | $R_1 = +0.8431\ F$ | $d_1 = 0.0394\ F$ | $n_1 = 1.73520$ |
| | | | $R_1' = +0.4845\ F$ | $s_\alpha = s_{12} = 0.4580\ F$ | |
| B | II | L₂ | $R_2 = +0.5436\ F$ | $d_2 = 0.1803\ F$ | $n_2 = 1.80518$ |
| | | | $R_2' = +0.4443\ F$ | $s_\beta = s_{23} = 0.0821\ F$ | |
| C | III | L₃ | $R_3 = +0.9460\ F$ | $d_3 = 0.2202\ F$ | $n_3 = 1.78831$ |
| | | | $R_3' = -0.4845\ F$ | $s_{34} = 0$ | |
| | | L₄ | $R_4 = -0.4845\ F$ | $d_4 = 0.1067\ F$ | $n_4 = 1.63980$ |
| | | | $R_4' = +2.1179\ F$ | $s_{CS} = s_{45} = 0.0694\ F$ | |
| D | IV | L₅ | $R_5 = +5.8838\ F$ | $d_5 = 0.0495\ F$ | $n_5 = 1.464450$ |
| | | | $R_5' = +0.4845\ F$ | $s_{56} = 0$ | |
| | | L₆ | $R_6 = +0.4845\ F$ | $d_6 = 0.5396\ F$ | $n_6 = 1.68273$ |
| | | | $R_6' = -0.3821\ F$ | $s_{67} = 0$ | |
| | | L₇ | $R_7 = -0.3821\ F$ | $d_7 = 0.0495\ F$ | $n_7 = 1.84666$ |
| | | | $R_7' = -0.8133\ F$ | $s_\gamma = s_{78} = 0.3523\ F$ | |
| E | V | L₈ | $R_8 = -0.4607\ F$ | $d_8 = 0.0329\ F$ | $n_8 = 1.71300$ |
| | | | $R_8' = -0.9598\ F$ | | |

4. A lens as defined in claim 1, wherein the dimensions and other characteristics are substantially as indicated in the following table, linear dimensions being expressed in proportion to the equivalent focal length F = 1 of the entire lens assembly

| | | | | | |
|---|---|---|---|---|---|
| A | I | L₁ | $R_1 = +0.6720\ F$ | $d_1 = 0.0341\ F$ | $n_1 = 1.71300$ |
| | | | $R_1' = +0.4559\ F$ | $s_\alpha = s_{12} = 0.3753\ F$ | |
| B | II | L₂ | $R_2 = +0.5378\ F$ | $d_2 = 0.2331\ F$ | $n_2 = 1.72830$ |
| | | | $R_2' = +0.4003\ F$ | $s_\beta = s_{23} = 0.0896\ F$ | |
| C | III | L₃ | $R_3 = +1.0129\ F$ | $d_3 = 0.1910\ F$ | $n_3 = 1.78831$ |
| | | | $R_3' = -0.4241\ F$ | $s_{34} = 0$ | |
| | | L₄ | $R_4 = -0.4241\ F$ | $d_4 = 0.0377\ F$ | $n_4 = 1.65473$ |
| | | | $R_4' = +2.2510\ F$ | $s_{CS} = s_{45} = 0.0676\ F$ | |
| | | | $R_5 = +19.922\ F$ | | |

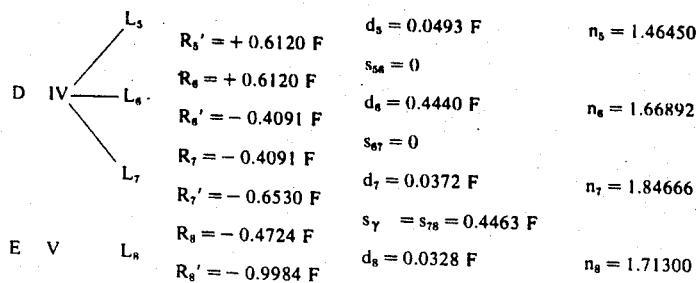

| | | | | $R_5' = +0.6120\ F$ | $d_5 = 0.0493\ F$ | $n_5 = 1.46450$ |
| | | | | $R_6 = +0.6120\ F$ | $s_{56} = 0$ | |
| D | IV | | $L_6$ | $R_6' = -0.4091\ F$ | $d_6 = 0.4440\ F$ | $n_6 = 1.66892$ |
| | | | | $R_7 = -0.4091\ F$ | $s_{67} = 0$ | |
| | | | $L_7$ | $R_7' = -0.6530\ F$ | $d_7 = 0.0372\ F$ | $n_7 = 1.84666$ |
| | | | | $R_8 = -0.4724\ F$ | $s_\gamma = s_{78} = 0.4463\ F$ | |
| E | V | $L_8$ | | $R_8' = -0.9984\ F$ | $d_8 = 0.0328\ F$ | $n_8 = 1.71300$ |

5. A lens as defined in claim 1, wherein the dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +0.91002\ F$ | $d_1 = 0.0517\ F$ | $n_1 = 1.58893$ |
| | | | $R_1' = +0.51913\ F$ | $s_\alpha = s_{12} = 0.5011\ F$ | |
| B | II | $L_2$ | $R_2 = +0.50438\ F$ | $d_2 = 0.1330\ F$ | $n_2 = 1.78470$ |
| | | | $R_2' = +0.41531\ F$ | $s_\beta = s_{23} = 0.1266\ F$ | |
| C | III | $L_3$ | $R_3 = +0.97786\ F$ | $d_3 = 0.2299\ F$ | $n_3 = 1.78831$ |
| | | | $R_3' = -0.51913\ F$ | $s_{34} = 0$ | |
| | | $L_4$ | $R_4 = -0.51913\ F$ | $d_4 = 0.1318\ F$ | $n_4 = 1.65446$ |
| | | | $R_4' = +4.46321\ F$ | $s_{cs} = s_{45} = 0.0697\ F$ | |
| | | | $R_5 = \pm\ \text{plan}$ | $d_5 = 0.2222\ F$ | $n_5 = 1.62299$ |
| D | IV | $L_5$ | $R_5' = +0.49004\ F$ | $s_{56} = 0$ | |
| | | $L_6$ | $R_6 = +0.49004\ F$ | $d_6 = 0.3681\ F$ | $n_6 = 1.74400$ |
| | | | $R_6' = -0.40358\ F$ | $s_{67} = 0$ | |
| | | $L_7$ | $R_7 = -0.40358\ F$ | $d_7 = 0.0310\ F$ | $n_7 = 1.84666$ |
| | | | $R_7' = -0.87148\ F$ | $s_\gamma = s_{78} = 0.3849\ F$ | |
| E | V | $L_8$ | $R_8 = -0.45932\ F$ | $d_8 = 0.0336\ F$ | $n_8 = 1.71300$ |
| | | | $R_8' = -0.92317\ F$ | | |

6. A lens whose dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +1.1000\ F$ | $d_1 = 0.0350\ F$ | $n_1 = 1.700$ |
| | | | $R_1' = +0.4700\ F$ | $s_\alpha = s_{12} = 0.2600\ F$ | |
| B | II | $L_2$ | $R_2 = +0.7200\ F$ | $d_2 = 0.2000\ F$ | $n_2 = 1.850$ |
| | | | $R_2' = +1.1000\ F$ | $s_{23} = 0.0508\ldots F$ | |
| | III | $L_3$ | $R_3 = +0.9800\ F$ | $d_3 = 0.2150\ F$ | $n_3 = 1.800$ |
| | | | $R_3' = +0.4700\ F$ | $s_\beta = s_{34} = 0.0500\ F$ | |
| C | IV | $L_4$ | $R_4 = +0.6100\ F$ | $d_4 = 0.1530\ F$ | $n_4 = 1.710$ |
| | | | $R_4' = -0.4000\ F$ | $s_{45} = 0$ | |
| | | $L_5$ | $R_5 = -0.4000\ F$ | $d_5 = 0.0800\ F$ | $n_5 = 1.600$ |
| | | | $R_5' = +2.4000\ F$ | $s_{cs} = s_{56} = 0.0700\ F$ | |
| D | V | $L_6$ | $R_6 = +2.4000\ F$ | $d_6 = 0.0400\ F$ | $n_6 = 1.460$ |
| | | | $R_6' = +0.5100\ F$ | $s_{67} = 0$ | |
| | | $L_7$ | $R_7 = +0.5100\ F$ | $d_7 = 0.4800\ F$ | $n_7 = 1.690$ |
| | | | $R_7' = -0.3645\ F$ | $s_{78} = 0.0052\ F$ | |
| | VI | $L_8$ | $R_8 = -0.3600\ F$ | $d_8 = 0.0504\ F$ | $n_8 = 1.850$ |
| | | | $R_8' = -0.7200\ F$ | $s_\gamma = s_{89} = 0.3014\ F$ | |
| E | VII | $L_9$ | $R_9 = -0.4000\ F$ | $d_9 = 0.1550\ F$ | $n_9 = 1.620$ |
| | | | $R_9' = -1.61355\ F$ | | |

7. A lens whose dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +1.300\ F$ | $d_1 = 0.0300\ F$ | $n_1 = 1.65$ |
| | | | $R_1' = +0.980\ F$ | $s_{12} = 0.0100\ F$ | |
| | II | $L_2$ | $R_2 = +0.920\ F$ | $d_2 = 0.0300\ F$ | $n_2 = 1.70$ |
| | | | $R_2' = +0.465\ F$ | $s_\alpha = s_{23} = 0.2300\ F$ | |
| B | III | $L_3$ | $R_3 = +0.700\ F$ | $d_3 = 0.5000\ F$ | $n_3 = 1.80$ |
| | | | $R_3' = +0.465\ F$ | $s_\beta = s_{34} = 0.0400\ F$ | |
| C | IV | $L_4$ | $R_4 = +0.600\ F$ | $d_4 = 0.1500\ F$ | $n_4 = 1.70$ |
| | | | $R_4' = -0.400\ F$ | $s_{45} = 0$ | |
| | | $L_5$ | $R_5 = -0.400\ F$ | $d_5 = 0.0300\ F$ | $n_5 = 1.58$ |
| | | | $R_5' = +3.000\ F$ | $s_{CS} = s_{56} = 0.0700\ F$ | |
| D | V | $L_6$ | $R_6 = +2.37931\ F$ | $d_6 = 0.0385\ F$ | $n_6 = 1.46$ |
| | | | $R_6' = +0.500\ F$ | $s_{67} = 0$ | |
| | | $L_7$ | $R_7 = +0.500\ F$ | $d_7 = 0.4935\ F$ | $n_7 = 1.69$ |
| | | | $R_7' = -0.350\ F$ | $s_{78} = 0$ | |
| | | $L_8$ | $R_8 = -0.350\ F$ | $d_8 = 0.0400\ F$ | $n_8 = 1.85$ |
| | | | $R_8' = -0.700\ F$ | $s_\gamma = s_{89} = 0.3370\ F$ | |
| E | VI | $L_9$ | $R_9 = -0.400\ F$ | $d_9 = 0.0800\ F$ | $n_9 = 1.60$ |
| | | | $R_9' = -1.54183\ F$ | | |

8. A lens whose dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +1.1000\ F$ | $d_1 = 0.0400\ F$ | $n_1 = 1.695$ |
| | | | $R_1' = +0.4700\ F$ | $s_\alpha = s_{12} = 0.2150\ F$ | |
| B | II | $L_2$ | $R_2 = +0.7150\ F$ | $d_2 = 0.5720\ F$ | $n_2 = 1.805$ |
| | | | $R_2' = +0.4720\ F$ | $s_\beta = s_{23} = 0.0730\ F$ | |
| C | III | $L_3$ | $R_3 = +0.6238\ F$ | $d_3 = 0.1736\ F$ | $n_3 = 1.715$ |
| | | | $R_3' = -0.4050\ F$ | $s_{34} = 0$ | |
| | | $L_4$ | $R_4 = -0.4050\ F$ | $d_4 = 0.0250\ F$ | $n_4 = 1.575$ |
| | | | $R_4' = +2.4500\ F$ | $s_{CS} = s_{45} = 0.0145\ F$ | |
| D | IV | $L_5$ | $R_5 = +2.4500\ F$ | $d_5 = 0.0405\ F$ | $n_5 = 1.465$ |
| | | | $R_5' = +0.5050\ F$ | $s_{56} = 0$ | |
| | | $L_6$ | $R_6 = +0.5050\ F$ | $d_6 = 0.4850\ F$ | $n_6 = 1.690$ |
| | | | $R_6' = -0.3600\ F$ | $s_{67} = 0$ | |
| | | $L_7$ | $R_7 = -0.3600\ F$ | $d_7 = 0.0305\ F$ | $n_7 = 1.855$ |
| | | | $R_7' = -0.7550\ F$ | $s_\gamma = s_{78} = 0.3349\ F$ | |
| E | V | $L_8$ | $R_8 = -0.4350\ F$ | $d_8 = 0.0925\ F$ | $n_8 = 1.620$ |
| | | | $R_8' = -1.4996\ F$ | | |

9. A lens whose dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +1.100\ F$ | $d_1 = 0.0400\ F$ | $n_1 = 1.695$ |
| | | | $R_1' = +0.470\ F$ | $s_\alpha = s_{12} = 0.2550\ F$ | |
| B | II | $L_2$ | $R_2 = +0.710\ F$ | $d_2 = 0.5000\ F$ | $n_2 = 1.805$ |
| | | | $R_2' = +0.470\ F$ | $s_\beta = s_{23} = 0.0400\ F$ | |
| | | $L_3$ | $R_3 = +0.610\ F$ | $d_3 = 0.1500\ F$ | $n_3 = 1.715$ |
| C | III | | $R_3' = -0.405\ F$ | $s_{34} = 0$ | |
| | | $L_4$ | $R_4 = -0.405\ F$ | $d_4 = 0.0250\ F$ | $n_4 = 1.575$ |
| | | | $R_4' = +2.450\ F$ | $s_{CS} = s_{45} = 0.0145\ F$ | |
| | | $L_5$ | $R_5 = +2.450\ F$ | $d_5 = 0.0405\ F$ | $n_5 = 1.465$ |
| | | | $R_5' = +0.505\ F$ | $s_{56} = 0$ | |
| D | IV | $L_6$ | $R_6 = +0.505\ F$ | $d_6 = 0.4850\ F$ | $n_6 = 1.690$ |
| | | | $R_6' = -0.360\ F$ | $s_{67} = 0$ | |
| | | $L_7$ | $R_7 = -0.360\ F$ | $d_7 = 0.0290\ F$ | $n_7 = 1.855$ |
| | | | $R_7' = -0.755\ F$ | $s_\gamma = s_{78} = 0.3350\ F$ | |
| E | V | $L_8$ | $R_8 = -0.435\ F$ | $d_8 = 0.0937\ F$ | $n_8 = 1.620$ |
| | | | $R_8' = -1.500\ F$ | | |

10. A lens whose dimensions and other characteristics are substantially as indicated in the following table, linear dimensions being expressed in proportion to the equivalent focal length $F = 1$ of the entire lens assembly

| | | | | | |
|---|---|---|---|---|---|
| A | I | $L_1$ | $R_1 = +1.1296\ F$ | $d_1 = 0.0364\ F$ | $n_1 = 1.69761$ |
| | | | $R_1' = +0.4729\ F$ | $s_\alpha = s_{12} = 0.2590\ F$ | |
| B | II | $L_2$ | $R_2 = +0.7076\ F$ | $d_2 = 0.5023\ F$ | $n_2 = 1.80518$ |
| | | | $R_2' = +0.4695\ F$ | $s_\beta = s_{23} = 0.0364\ F$ | |
| | | $L_3$ | $R_3 = +0.6083\ F$ | $d_3 = 0.1510\ F$ | $n_3 = 1.71300$ |
| C | III | | $R_3' = -0.4066\ F$ | $s_{34} = 0$ | |
| | | $L_4$ | $R_4 = -0.4066\ F$ | $d_4 = 0.0221\ F$ | $n_4 = 1.57501$ |
| | | | $R_4' = +2.3195\ F$ | $s_{CS} = s_{45} = 0.0651\ F$ | |
| | | $L_5$ | $R_5 = +2.5654\ F$ | $d_5 = 0.0390\ F$ | $n_5 = 1.46450$ |
| | | | $R_5' = +0.5082\ F$ | $s_{56} = 0$ | |
| D | IV | $L_6$ | $R_6 = +0.5082\ F$ | $d_6 = 0.5101\ F$ | $n_6 = 1.68900$ |
| | | | $R_6' = -0.3624\ F$ | $s_{67} = 0$ | |
| | | $L_7$ | $R_7 = -0.3624\ F$ | $d_7 = 0.0299\ F$ | $n_7 = 1.85544$ |
| | | | $R_7' = -0.7230\ F$ | $s_\gamma = s_{78} = 0.3370\ F$ | |
| E | V | $L_8$ | $R_8 = -0.4369\ F$ | $d_8 = 0.1028\ F$ | $n_8 = 1.62041$ |
| | | | $R_8' = -1.4955\ F$ | | |

\* \* \* \* \*